United States Patent [19]

Holtmyer et al.

[11] Patent Number: 4,554,082
[45] Date of Patent: Nov. 19, 1985

[54] FRACTURING METHOD FOR STIMULATION OF WELLS UTILIZING CARBON DIOXIDE BASED FLUIDS

[75] Inventors: Marlin D. Holtmyer; Phillip C. Harris; Charles V. Hunt, all of Duncan, Okla.

[73] Assignee: Halliburton Company, Duncan, Okla.

[21] Appl. No.: 702,986

[22] Filed: Feb. 19, 1985

Related U.S. Application Data

[62] Division of Ser. No. 572,732, Jan. 20, 1984, Pat. No. 4,519,455.

[51] Int. Cl.$^4$ .............................................. E21B 43/26
[52] U.S. Cl. .............................. 252/8.55 R; 166/305.1
[58] Field of Search ........... 166/281, 308, 309, 305 R; 252/8.55 C, 8.55 D, 8.55 R, 8.5 R

[56] References Cited

U.S. PATENT DOCUMENTS

| | | | |
|---|---|---|---|
| 3,310,112 | 3/1967 | Nielson et al. | |
| 3,664,422 | 5/1972 | Bullen | 166/283 |
| 3,765,488 | 10/1973 | Pence | 166/308 |
| 3,842,910 | 10/1974 | Zingg et al. | 166/308 X |
| 3,937,283 | 2/1976 | Blauer et al. | 166/307 |
| 3,954,626 | 5/1976 | Greminger et al. | 252/8.55 |
| 3,980,136 | 9/1976 | Plummer et al. | 166/280 |
| 4,267,887 | 5/1981 | Watanabe | 166/300 |
| 4,480,696 | 11/1984 | Almond et al. | 252/8.55 X |

OTHER PUBLICATIONS

Dunning et al., "Using Foaming Agents to Remove Liquids from Gas Wells", Bureau of Mines, 1961, pp. 12–13.

*Primary Examiner*—Herbert B. Guynn
*Attorney, Agent, or Firm*—Robert A. Kent; Thomas R. Weaver

[57] ABSTRACT

A method of fracturing a subterranean formation with a stabilized foamed fracturing fluid comprising from about 30 percent to in excess of about 95 percent by volume of carbon dioxide with the remainder comprising a substantially anhydrous liquid and a selected surfactant. The foam is formed in situ by injection of a stabilized liquid-liquid emulsion containing liquid carbon dioxide into a well bore penetrating the formation. The temperature and pressure of the emulsion is controlled to maintain the carbon dioxide in the liquid phase during injection into the well bore. Thereafter, the carbon dioxide is heated by the subterranean formation to a temperature above about 88° F. at which time the stabilized emulsion spontaneously forms a high quality stabilized foam.

5 Claims, No Drawings

FRACTURING METHOD FOR STIMULATION OF WELLS UTILIZING CARBON DIOXIDE BASED FLUIDS

This application is a division of application Ser. No. 572,732 filed Jan. 20, 1984, now U.S. Pat. No. 4,519,455.

BACKGROUND OF THE INVENTION

1. Field of the Invention

This invention relates to a method of fracturing subterranean formations penetrated by a well bore utilizing carbon dioxide based fluids. More particularly, this invention relates to a method of fracturing a subterranean formation with a substantially anhydrous two-phase fluid.

2. Description of the Prior Art

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the well bore at sufficient pressure and flow rate to fracture the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

A traditional fracturing technique utilizes a water or oil-based fluid to fracture a hydrocarbon-bearing formation.

Another successful fracturing technique has been that known as "foam fracturing". This process is described in, for example, U.S. Pat. No. 3,980,136. Briefly, that process involves generation of a foam of a desired "Mitchell quality" which then is introduced through a well bore into a formation which is to be fractured. The composition of the foam is such that the Mitchell foam quality at the bottom of the well is in the range of from about 0.53 to 0.99. Various gases and liquids can be used to create the foam, but foams generally used in the art are made from nitrogen and water, in the presence of a suitable surfactant. The pressure at which the foam is pumped into the well is such that it will cause a fracture of the hydrocarbon-bearing formation. Additionally, the foam comes out of the well easily when the pressure is released from the well head, because the foam expands when the pressure is reduced.

Yet another fracturing technique has been that which utilizes a liquefied, normally gaseous fluid. U.S. Pat. No. 3,195,634, for example, discloses a method for treating a subterranean formation penetrated by a well bore with a composition comprising a liquid-liquid mixture of carbon dioxide and water. The carbon dioxide is present in an amount equivalent to from about 300 to about 1500 SCF at 80° F. and 14.7 psia per 42 gallons of water. The composition is injected into the formation under sufficient pressure to fracture the formation. The composition can include gelling agents and proppant materials. Upon pressure release at the well head, the liquid carbon dioxide vaporizes and flows from the formation.

U.S. Pat. No. 3,310,112 discloses a method of fracturing a subterranean formation penetrated by a well bore comprising introduction of a mixture of liquid carbon dioxide and a propping agent slurried in a suitable vehicle into the well bore at a pressure sufficient to fracture the formation. The liquid carbon dioxide is present in an amount sufficient to provide at least five volumes of carbon dioxide per volume of slurried propping agent. After injection of the liquid carbon dioxide containing the propping agent, the pressure on the well bore is released. The liquid carbon dioxide normally is heated sufficiently by the formation that upon pressure release, the liquid carbon dioxide returns to a gas phase. A substantial portion of the carbon dioxide then leaves the well and forces or carries out with it an appreciable amount of the oil or aqueous vehicle utilized to transport the proppant.

U.S. Pat. No. 3,368,627 discloses a method of treating a formation penetrated by a well bore which consists essentially of injecting down the well bore a fluid azeotropic mixture which has a critical temperature sufficiently high or a critical pressure sufficiently low to remain a liquid at the temperature and pressure existing during injection and treatment of the formation. The fluid mixture has critical properties such that a substantial portion of the injected fluid is converted to a gas upon a release of the pressure applied to the liquid during injection into the formation. The fluid mixture consists essentially of carbon dioxide and at least one $C_2$ to $C_6$ hydrocarbon.

U.S. Pat. No. 3,664,422 discloses a method of treating a subsurface earth formation penetrated by a well bore comprising injection of a liquefied gas together with a gelled alcohol into the formation at a pressure sufficient to fracture the formation. The liquefied gas is returned from the formation by vaporization following pressure reduction on the well bore. The gelled alcohol is removed by vaporization during subsequent production from the well leaving only the broken gelling agent in the formation.

It would be desirable to provide a method by which a viscous fluid can be created from carbon dioxide and a substantially anhydrous fluid which is stable over a broad temperature range and is capable of carrying high concentrations of proppant into a subterranean formation.

SUMMARY OF THE INVENTION

The present invention relates to a method and fluids for forming fractures in subterranean formations penetrated by a well bore and transporting increased concentrations of proppant material into the formation penetrated by the well bore. The method and fluids permit increased penetration of the formation by the fluids together with low fluid leak-off to the formation and the ability to carry high concentrations of proppant material without proppant settling in the fracturing fluids. The fracturing fluids of the invention are stabilized liquid-liquid emulsions of liquefied carbon dioxide and a substantially anhydrous fluid at surface conditions, and the emulsion is converted into a gas-in-liquid foam upon heating in the formation to a temperature above the critical temperature of the carbon dioxide. The fracturing fluids comprise from about 30 to in excess of 95 percent by volume carbon dioxide. The fracturing fluid contains a surfactant which stabilizes the emulsion and foam which is produced against breakdown and can include proppant material and the like.

The emulsions and foams produced by the method of the present invention are characterized by a high quality, that is, the ratio of the carbon dioxide volume to the volume of the carbon dioxide and substantially anhydrous liquids in the fluid is very high and the emulsions and foams have a viscosity sufficient to transport significant concentrations of proppant material. The emulsion which is formed by practice of the present method has a very fine cell size distribution or texture which is sufficiently stable to support proppant material in concentrations up to a level in excess of about 15 pounds per gallon of emulsion.

DESCRIPTION OF THE PREFERRED EMBODIMENT

In the practice of the present invention, a fracturing fluid is prepared by admixing, under suitable conditions of temperature and pressure, a quantity of liquefied carbon dioxide with a substantially anhydrous liquid and a surfactant to form a stabilized liquid-liquid emulsion.

The liquefied carbon dioxide is provided from a surface vessel at a temperature and pressure sufficient to maintain the liquid conditions of the normally gaseous carbon dioxide, such as for example, a temperature of about 0° F. and a pressure of about 300 psia. The liquid carbon dioxide is admixed with the anhydrous fluid in an amount sufficient to provide a volumetric ratio of liquid carbon dioxide to substantially anhydrous fluid in the range of from about 1:2 to about 19:1. Preferably, the ratio is in the range of from about 2:1 to about 4:1. The foam formed from the emulsion, preferably, will have a quality of from about 65 percent to in excess of about 80 percent. The term "quality" as used herein is intended to mean the percentage of the volume of carbon dioxide at the existing temperature and pressure within the formation to the volume of the carbon dioxide plus the volume of the substantially anhydrous fluid and any other liquid components present in the fracturing fluid.

The substantially anhydrous fluid comprises an admixture of ethylene glycol and a hydrocarbon compound. This fluid comprised of two Newtonian fluids appears to exhibit pseudoplastic behavior. The hydrocarbon can comprise, for example, kerosene, diesel fuel, jet fuel, refined or light crude oils or the like. The ethylene glycol is admixed with the hydrocarbon in an amount of from about 1:3 to about 2:1. The ethylene glycol can comprise from about 25 to about 70 percent by volume of the anhydrous fluid. Preferably, the ethylene glycol comprises from about 40 to about 60 percent by volume of the anhydrous fluid.

The hydrocarbon can comprise from about 30 to about 75 percent by volume of the anhydrous fluid. Preferably, the hydrocarbon comprises from about 40 to about 60 percent by volume of the anhydrous fluid.

The fracturing fluid of the present invention can be characterized as comprising ethylene glycol present in an amount of from about 1 to about 50 percent by weight of the liquid constituents of the fluid, a hydrocarbon present in an amount of from about 1 to about 55 percent by weight of the liquid constituents of the fluid, a surfactant present in an amount sufficient to stabilize the fracturing fluid and carbon dioxide present in an amount of from about 30 to about 95 percent by volume of the fracturing fluid composition.

The hydrocarbon is believed to be miscible with the liquid carbon dioxide and to provide a site for or seed structure for the formation of very fine droplets of liquid carbon dioxide in the ethylene glycol.

The liquid carbon dioxide and substantially anhydrous fluid can be admixed in a pressurized mixer or other suitable apparatus. In one preferred embodiment, the carbon dioxide and substantially anhydrous liquid are admixed by turbulent contact at a simple "T" connection in the fracturing fluid injection pipeline to form the emulsion. The emulsion will have a temperature below about the critical temperature of the carbon dioxide. The liquid-liquid emulsion is stabilized by the addition of a quantity of a selected surfactant. The surfactant comprises any suitable compound capable of forming a stable emulsion of the ethylene glycol and hydrocarbon and which remains stable in the presence of carbon dioxide. The surfactant can comprise cationic, anionic or nonionic compounds, such as for example, betaines, sulfated alkoxylates such as $C_8$ to $C_{18}$ hydrocarbons alkoxylated with 2 to 10 moles of ethylene oxide or the like, alkyl quaternary amines, alkyl diethanol amines, ethyoxylated linear alcohols such as $C_8$ to $C_{18}$ hydrocarbons ethyoxylated with 12 to 40 moles of ethylene oxide or alkyl amine oxides. The particular surfactant employed will depend upon the type of formation which is to be fractured. The surfactant is admixed with the anhydrous fluid in an amount of from about 10 to about 50 gallons per 1000 gallons of anhydrous fluid to provide a surfactant concentration of from about 1 percent to about 5 percent by weight. It is to be understood that larger quantities of the designated surfactants can be employed, however, such use is uneconomical. The surfactant, preferably, is admixed with the substantially anhydrous liquid prior to formation of the emulsion to facilitate uniform admixing.

The stabilized emulsion which is formed is characterized by a very fine cell size distribution or texture. The term "cell size" as used herein means the size of the gaseous or liquid carbon dioxide droplet which is surrounded by the substantially anhydrous fluid phase in the emulsion. The term "texture" as used herein means the general appearance of the distributed cells of gaseous or liquid carbon dioxide in the emulsion. The fine texture of the emulsion of the present invention permits the transport of high concentrations of proppant material.

The viscous substantially anhydrous fluid thus formed can be used to transport significant quantities of proppant material to the point of mixing with the carbon dioxide. The proppant material can comprise, for example, sand, graded gravel, glass beads, sintered bauxite, resin-coated sand or the like.

The proppant material is admixed with the viscous fluid prior to admixing with the liquid carbon dioxide. The admixing of the proppant material with the viscous fluid can be effected in any suitable mixing apparatus, such as for example, a batch mixer or the like.

The amount of proppant material admixed with the viscous fluid may be varied to provide the desired amount of proppant in the two-phase fluid introduced into the formation. The proppant material can be admixed with the viscous substantially anhydrous fluid in an amount of from about zero pounds of proppant per gallon of viscous fluid up to as many pounds of proppant material per gallon as may be pumped. Depending upon formation reservoir conditions, the amount of proppant material transported by the two-phase fluid within the subterranean formation generally can be in the range of from about ½ pound to about 15 pounds per gallon of two-phase fracturing fluid without a screen out occurring.

The fracturing fluid of the present invention is introduced into the well bore which penetrates the subterranean formation to be treated at a temperature below the critical temperature of the carbon dioxide and at a pressure above the critical pressure of the carbon dioxide. The initial viscosity of the liquid-liquid emulsion comprising the fracturing fluid is such that the fluid is easily pumped through the well bore, however, the viscosity of the fluid still is sufficient to support a significant quantity of proppant material.

As the fracturing fluid is introduced into the subterranean formation, the fluid slowly is heated to a temperature above the critical temperature of the carbon dioxide. Surprisingly, it has been found that when the stabilized liquid-liquid emulsion is heated to a temperature above the critical temperature of the carbon dioxide, the fluid maintains its viscosity and undergoes conversion into a foam. The foam as well as the emulsion is stabilized by the presence of the surfactant present in the fracturing fluid. As the liquid carbon dioxide undergoes conversion to a gas, a slight increase in the volume of the carbon dioxide is found to occur. The term "gas" as used herein means a fluid at a temperature equal to or above the critical temperature of the fluid while maintained at any given pressure. Upon conversion of the stabilized liquid-liquid emulsion of the present invention to a foam, the foam is found to be substantially stabilized and it continues to transport the proppant material into the fracture formed in the subterranean formation by the foamed fracturing fluid with at least substantially the same effectiveness as any other viscous fluid. The foam has been found to have a viscosity immediately after formation which is substantially the same as the viscosity of the liquid-liquid emulsion. Further, the foam substantially reduces any fluid leak-off to the formation that otherwise would occur if only a liquid fracturing fluid was utilized to treat the formation. The low fluid-loss characteristics of the fracturing fluid of the present invention results in a greater volumetric efficiency for a given volume and injection rate of the fracturing fluid in comparison to liquid fracturing fluids.

After the introduction of the full amount of the calculated or estimated volume of fracturing fluid necessary to fracture the formation and transport the proppant material, the well bore is shut-in for a period of time sufficient to permit stabilization of the subterranean formation. In one embodiment, the well is shut-in for a period of time to permit the formation to at least partially close upon the proppant material and stabilize the fracture volume. The shut-in period can be from several minutes to in excess of about 12 hours and, preferably, is in the range of from about 1 to 2 hours. After the subterranean formation has stabilized, the well is opened under controlled conditions and the pressure drop in the well bore causes the foam to break. The carbon dioxide gas then moves from the formation into the well bore and exits the well bore at the surface. The gas carries from the formation substantially all of the liquids present in the fracturing area which leaves the formation and well clean and ready for the commencement of production.

Surprisingly, it has been found that the presence of significant quantities of any of the lower alcohols in the fracturing fluid of the present invention is highly undesirable. The presence of the alcohols has been found to significantly reduce the static stability of the fracturing fluids of the present invention. The viscosity of the fracturing fluids also have been found to be significantly reduced. Thus, the presence of lower alcohols generally is undesirable in the fracturing fluids of the present invention.

While generally undesirable, small quantities of aqueous fluids can be present in the fracturing fluid composition of the present invention. The fracturing fluid can comprise from about 0 to about 10 percent by weight of an aqueous fluid, if desired, without a significant decline in utility. The presence of a small quantity of an aqueous fluid can be advantageous in certain situations. It has been found that small quantities of an aqueous fluid in the fracturing fluid of the present invention result in a significant increase in the viscosity of the fluid. Thus, in appropriate situations, a small quantity of an aqueous fluid can replace a quantity of ethylene glycol in the fracturing fluid without a decrease in the viscosity of the fracturing fluid. Further, it has been found that the presence of small quantities of an aqueous fluid, such as water, within a formation during use of the fracturing fluid or in mixing equipment for the fracturing fluid generally will not detrimentally affect the utility of the fluid in the treatment of a subterranean formation.

To further illustrate the method of the present invention, and not by way of limitation, the following examples are provided.

EXAMPLE I

To illustrate the stability of the liquid-liquid emulsion, the following tests were performed.

A substantially anhydrous fluid mixture is prepared by mixing 960 milliliters of ethylene glycol, 960 milliliters of kerosene or No. 2 diesel and 80 milliliters of a surfactant comprising an ammonium salt of a sulfated linear $C_{12}$ to $C_{14}$ alcohol ethoxylated with 3 moles of ethylene oxide. A dual pump system is employed to simultaneously pump a quantity of liquid carbon dioxide and the substantially anhydrous fluid mixture into a recirculating loop viscometer at a pressure of 1,000 psi and a temperature of 75° F. The pumping rates are adjusted to obtain a desired ratio of carbon dioxide to anhydrous fluid to provide an emulsion of a selected quality.

The emulsion is recirculated within the viscometer for about five minutes to produce an approximately equilibrated fluid. The viscosity of the emulsion is measured at a shear rate of 500 sec$^{-1}$ after which the static fluid stability is determined. The static fluid stability is determined by closing a valve on the bottom side of the observation chamber of the viscometer and measuring the time required for the emulsion to separate. The results are set forth in the following table.

TABLE I

| Sample No. | Emulsion Quality, % | Apparent Viscosity at 500 Sec$^{-1}$, cp | Static Stability Minutes |
| --- | --- | --- | --- |
| 1 | 60[1] | 192 | 20 |
| 2 | 40[1] | 177 | 25 |
| 3 | 30[1] | 172 | 50 |
| 4 | 60[2] | 220 | 18 |
| 5 | 50[2] | 201 | 35 |
| 6 | 40[2] | 172 | 33 |

[1]Emulsion contained kerosene
[2]Emulsion contained No. 2 diesel

EXAMPLE II

To illustrate the detrimental effect of lower alcohols upon the physical properties of fluids containing constituents of the present invention, the following tests were performed:

Emulsions are prepared as in Example I to form fluids having the following compositions:

Fluid No. 1—12.3% ethylene glycol, 22.8% kerosene, 1.5% surfactant comprising an ammonium salt of a sulfated linear $C_{12}$ to $C_{14}$ alcohol ethoxylated with 3 moles of ethylene oxide, 1.4% methanol and 62% liquid carbon dioxide.

Fluid No. 2—25.1% ethylene glycol, 27.8% kerosene, 2.3% surfactant as above, 2.8% methanol and 42% liquid carbon dioxide.

The viscosity and static stability of the fluids then are determined as in Example I. The results are set forth in the following table:

TABLE II

| Fluid No. | Emulsion Quality, % | Apparent Viscosity at 500 $Sec^{-1}$, cp | Static Stability Minutes |
|---|---|---|---|
| 1 | 62 | 69 | 4 |
| 2 | 42 | 58 | 5 |

The data clearly illustrates the detrimental effect the presence of lower alcohols has upon both the viscosity and static stability of emulsions containing constituents of the present invention.

These tests clearly illustrate the substantial stability of the emulsion formed in accordance with the practice of the present invention. The stability of the foam formed in the tests also is an indication that the foam formed upon heating the carbon dioxide to a temperature above its critical temperature in the subterranean formation will have substantial stability.

The terms "stable" or "stabilized" as used herein with regard to the emulsions and foams of the present invention means the physical and functional properties of the fluid remain substantially unchanged for a period of time sufficient to permit the described formation treatment to be effected.

While preferred embodiments of the invention have been described herein, changes or modifications in the method may be made by an individual skilled in the art, without departing from the spirit or scope of the invention as set forth in the appended claims.

What is claimed is:

1. A substantially anhydrous, stabilized emulsion fluid composition comprising:
    ethylene glycol present in an amount of from about 1 percent to about 50 percent by weight of the liquid constituents of said composition;
    a hydrocarbon selected from the group consisting of kerosene, diesel fuel, jet fuel and refined or light crude oil present in an amount of from about 1 percent to about 55 percent by weight of the liquid constituents of said composition;
    a surfactant present in an amount sufficient to stabilize said composition;
    an aqueous fluid present in an amount of from about 0 to about 10 percent by weight of said composition; and
    liquid carbon dioxide present in an amount of from about 30 to about 95 percent by volume of said composition.

2. The composition of claim 1 wherein the hydrocarbon comprises kerosene.

3. The composition of claim 1 wherein the surfactant comprises at least one member selected from the group consisting of betaines, sulfated alkoxylates, ethyoxylated linear alcohols, alkyl quaternary amines, alkyl diethanol amines and alkyl amine oxides.

4. The composition of claim 1 defined further to include a proppant material.

5. The composition of claim 4 wherein said proppant is present in an amount of from about ½ pound to about 15 pounds per gallon of said composition.

* * * * *